April 21, 1936.           A. McL. NICOLSON            2,038,054
                              INDICATOR
                         Filed April 30, 1931         2 Sheets-Sheet 1
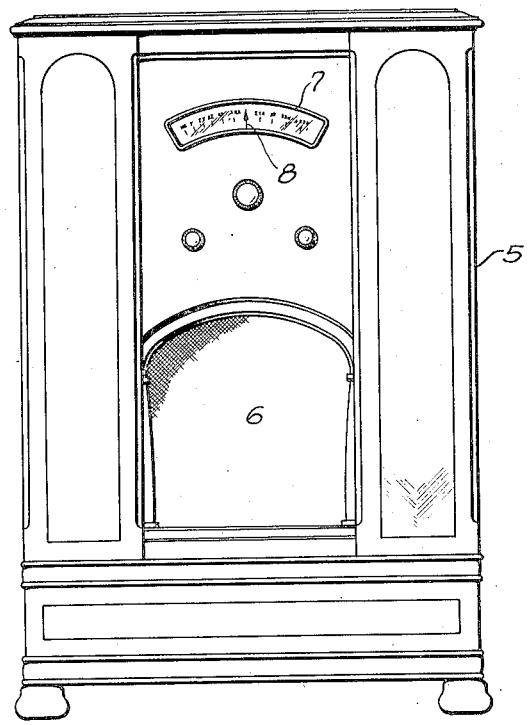
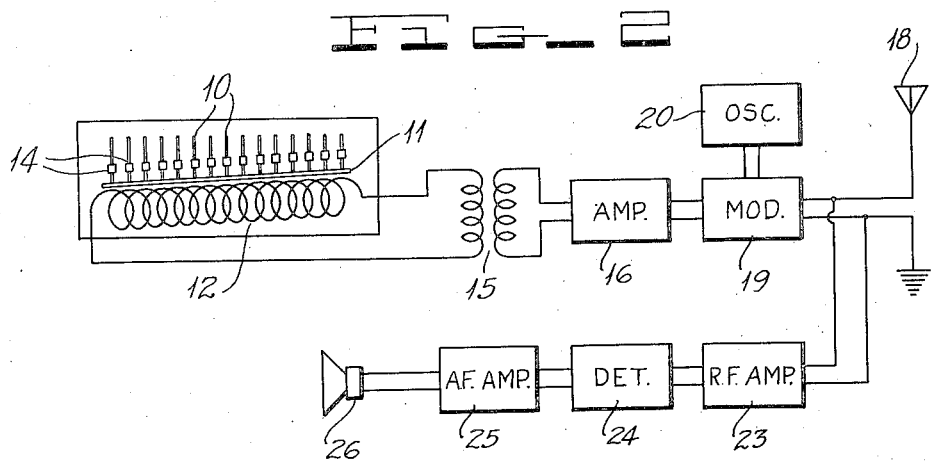
INVENTOR
Alexander McLean Nicolson
BY
Orl R. Goshaw
ATTORNEY April 21, 1936.　　A. McL. NICOLSON　　2,038,054
INDICATOR
Filed April 30, 1931　　2 Sheets-Sheet 2
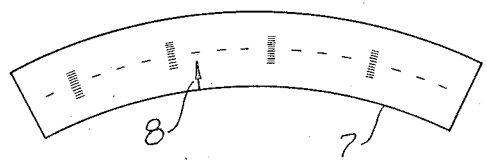
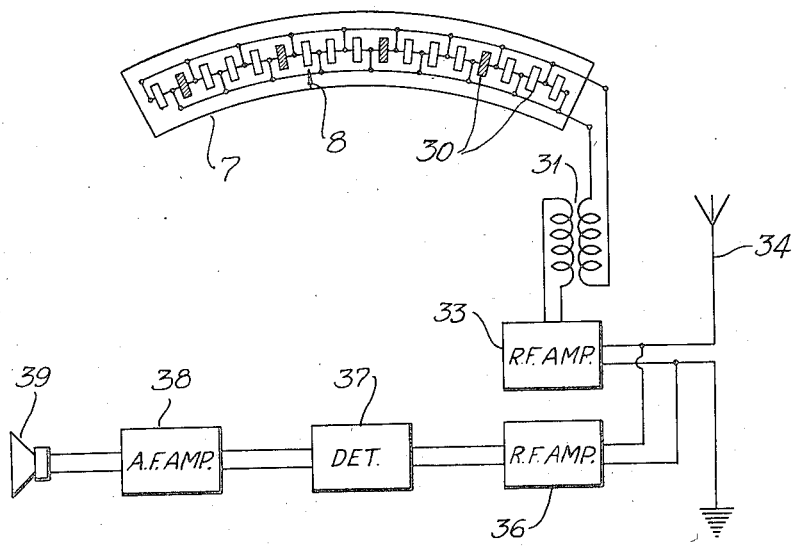
INVENTOR
Alexander McLean Nicolson
BY
ATTORNEY

Patented Apr. 21, 1936

2,038,054

UNITED STATES PATENT OFFICE 2,038,054

INDICATOR

Alexander McLean Nicolson, New York, N. Y., assignor to Communication Patents, Inc., New York, N. Y., a corporation of Delaware Application April 30, 1931, Serial No. 533,878

10 Claims. (Cl. 250—20)

This invention relates to indicating devices, and particularly to such devices for disclosing the broadcasting wave lengths which are available for reception at any particular instant.

An object of the invention is to indicate operating wave length channels.

Another object of the invention is to obtain a visual indication of the radio transmitting stations operating at any particular instant.

In the art of radio reception with the usual type of radio receiver having an inscribed plate with indicia in either wave lengths or station numerals, the present invention is adaptable for indicating the tuning of the receiver and to aid in the operation thereof. Prior devices indicate the one station being received at any one instant either by a pointer directed at the station wave length and in some instances by lights which illuminate the escutcheon inscribed dial at the correct position. The present invention is an advancement in this art by indicating to the operator and others what wave lengths are being transmitted or which stations are operating at the particular time that reception is desired.

The invention in brief is the provision of reeds or crystals which respond either by vibration or by a glow discharge, respectively, to the frequencies of the carrier waves of the broadcasting stations or to sub-multiple frequencies thereof. As the escutcheon plate is inscribed with wave lengths or station indicia, spatially disposed over the panel, a simultaneous indication of the working transmitters at any particular instant is provided.

The invention will be more fully understood by reference to the following description in conjunction with the accompanying drawings, in which:

Fig. 1 shows a typical console model radio receiver;

Fig. 2 is a diagrammatic arrangement of circuit apparatus and a front elevational view of one embodiment of the indicator;

Fig. 3 shows a plan view of the indicator in Fig. 2; and

Fig. 4 is a diagrammatic drawing of a second embodiment of the invention employing crystal indicator elements.

Referring specifically to Fig. 1 a console cabinet 5 having a loud speaker opening 6 has also an opening 7 behind which is located the indicating elements of either the embodiment shown in Fig. 2 or Fig. 4. The opening has inscribed above it the call letters of the radio broadcast stations, the wave lengths or the frequencies of these stations. The pointer 8 will show the condenser setting at any particular instant and the station to which the set is tuned.

One of the indicators which may be located behind the opening 7 is shown in Fig. 2. This indicator consists of a plurality of tuned reeds 10 mounted on a mounting base 11 with an energizing coil 12. The reeds have mounted thereon soft iron cores 14 which are acted on by the magnetic field produced by the coil 12. The coil 12 is connected by a transformer 15 to the output of an amplifier 16.

Radio broadcast signals as modulated carriers are received over an antenna system 18 and impressed upon a modulator 19, the modulator also being supplied from an oscillator 20. This is the simple heterodyne method of stepping down the carrier frequencies to an intermediate frequency for the usual heterodyne reception. In this particular case the carrier frequencies are reduced to a comparatively lower range than is usual in radio reception, this range being amplified and impressed upon the tuned reeds 10 for the vibration thereof. Since the reeds are mechanical devices, it is impracticable to vibrate them at radio broadcast frequencies, and it is necessary, therefore, to reduce the range to a practical value whereby the reeds may correctly indicate the broadcast frequency range.

Also connected to the antenna system 18 is a radio frequency amplifier 23 feeding a detector 24 and audio amplifier 25, the output of the audio amplifier being supplied to the loud speaker 26 in the usual manner. Of course, it is to be understood that the heterodyne or superheterodyne methods of reception may be employed in place of the tuned radio frequency systems.

In Fig. 3 the appearance of the reeds in the opening 7 of the console 5 is illustrated, four of the reeds being in vibration to indicate the energization of four broadcast transmitters. With this information before the operator, the particular selection of a station may be made with the knowledge that it will be received.

In Fig. 4 an indicator providing similar results is disclosed, but in which the reeds are replaced by crystals 30 connected in parallel with the secondary of an energizing transformer 31. Each of these crystals is dimensioned by construction to have a definite resonant frequency response so that upon energization of that particular frequency a glow discharge will occur on the visible face of the crystal. To improve the indicating qualities of the glow discharge, fluorescent particles may be painted on this visible face. The light may be increased by placing the crystals in an envelope evacuated to a pressure of about 7 millimeters, with or without a coloring gas, the envelope being painted with fluorescent material to aid observation. The transformer 31 is fed from a radio frequency amplifier 33 which in turn is supplied from the antenna system 34. Since the crystals may be operated at much higher frequencies than the mechanical reeds 10 of Figs. 2 and 3, the carrier frequencies may be directly impressed thereon. The fact that the carriers are modulated does not impair the system as an indicator as variations will occur at a sufficiently rapid rate to maintain a visual response. In parallel with the antenna 34 is a similar receiving system to that shown in Fig. 2 comprising a radio frequency amplifier 36, detector 37, audio frequency amplifier 38, and loud speaker 39. The indicator 6 may show the station wave length to which the receiver is tuned at any particular instant.

The operation of the system for indicating the broadcast station frequencies is obvious from the above, since it is only necessary to energize the oscillator, modulator and amplifier of Fig. 2 to produce energization of the particular reeds in accordance with the carrier frequencies being received. Similarly in Fig. 4 the radio frequency amplifier 33 should be energized to produce glow discharges on the crystals which are resonant to frequencies corresponding to the carrier frequencies of the transmission stations.

The above indicating system has many applications and is particularly applicable to commercial receivers located at transmitting and receiving points and to receivers in ships at sea. For instance, if such an indicator were employed in a ship receiver, a glance at the panel is all that is necessary to determine whether or not any transmitter is being operated. This method eliminates the use of cyclic varying tuning systems which are now employed in some instances. It is also within the purview of this invention to operate audible indicators such as buzzers or bells by the tuned reed relays.

Although the invention has been disclosed in two of its preferred embodiments, it is to be understood that the invention is to be limited only by the scope of the appended claims.

What is claimed is:

1. In an electrical indicator system, a receiving circuit for a plurality of signaling channels transmitting different carrier frequencies, means for receiving all of said frequencies simultaneously, means for receiving one of said frequencies at any particular time for audible reproduction, means for indicating the channels to which said receiver may be tuned, electro-mechanical means adjacent said last mentioned means and simultaneously impressed by said carrier frequencies for indicating the signal channels in operation during reception of any one channel, said electro-mechanical means serving both as means for discriminating between the different carrier frequencies and as visual indicators of their presence.

2. In an electrical signalling system, a receiving circuit for a plurality of signalling channels transmitting different carrier frequencies, a receiver of any particular channel for reproduction, a plurality of tuned reeds adapted to vibrate when energized with different frequencies, means co-operating with said reeds for indicating the channels to which said receiver may be tuned and means for impressing on said tuned reeds all of said carrier frequencies simultaneously during reception of one of said carrier frequencies to produce simultaneous visual indication thereof.

3. In an electrical indicating system, a receiving circuit for a plurality of carrier channels transmitting discrete carrier frequencies, means for receiving any one of said frequencies for reproduction, a plurality of crystals having different resonant frequencies within the frequency range of the signalling channels, means adjacent said crystals and indicating said carrier frequencies and means for impressing all of said signalling frequencies upon said crystals to produce a glow discharge on those having a resonant frequency corresponding with the incoming carrier frequencies.

4. In an electrical indicating system, the combination of a radio receiver, means for tuning said receiver to any one of a plurality of frequencies, station indicia mounted in view of an observer, a plurality of indicating electro-mechanical vibrating members corresponding to said plurality of frequencies adjacent said indicia and actuated simultaneously, and means independent of said receiver for causing the members corresponding to frequencies being transmitted to vibrate simultaneously during reception of any one of said frequencies on said receiver.

5. In an electrical indicating system, the combination of a radio receiver, means for tuning said receiver, means for indicating the tuning at any instant, station indicia located in view of an observer, and means independent of said receiver for simultaneously illuminating the indicia of all of said broadcasting stations operating at any instant during reception of any one station by the direct application of the carrier wave frequencies of said stations on said illuminating means.

6. In an electrical indicating system, the combination of a radio receiver, means for tuning the receiver, means for indicating the tuning at any instant, station indicia located in view of an observer, and means for simultaneously illuminating the indicia of all of said broadcasting stations operating at any instant during reception of any one station by the direct application of the carrier waves of said station on said illuminating means, said illumination being obtained from a plurality of tuned piezoelectric crystals resonant to the carrier frequencies of broadcast channels.

7. In an electrical signalling system, a radio receiver, means for tuning said receiver to any one of a plurality of carrier frequencies, an antenna for said receiver, a heterodyne circuit connected to said antenna for reducing the original broadcast carrier frequencies to a corresponding lower range, a plurality of mechanically tuned members responsive to said lower range of frequencies, and means for impressing said lower range of frequencies upon said mechanical tuned members, the members tuned to said lower range of frequencies becoming simultaneously actuated when corresponding carrier frequencies are being received in said antenna.

8. In an electrical indicating system, the combination of an antenna circuit having a plurality of carrier frequencies induced therein, a modulator connected thereto, an oscillator supplying said modulator, said oscillator and modulator reducing said carrier frequencies to a corresponding lower range of frequencies, an amplifier for amplifying the output of said modulator, a field producing work circuit connected in the output of said amplifier, and a plurality of mechanically tuned elements located in the field of said work circuit adapted to be energized by said lower range of frequencies in accordance with the carrier waves in said antenna.

9. In an electrical signalling system, a radio receiver having indicia for indicating carrier frequencies, means for tuning said receiver to any one of said carrier frequencies, an antenna for said receiver, means for impressing a portion of the energy in said antenna upon said receiver, and means actuated by the remainder of said energy for simultaneously indicating all the carrier frequencies induced in said antenna, said actuated means functioning as both frequency discriminators and visual indicators of said carrier frequencies in said antenna.

10. In an electrical signalling system, a radio receiver having tuning indicia located thereon, means for tuning said receiver to any one of a plurality of carrier frequencies, an antenna system connected to said receiver in which said carrier frequencies are induced, a plurality of indicating electro-mechanical elements adjacent said indicia and having a resonance range corresponding to the carrier frequency range induced in said antenna, and means independent of said receiver for energizing those of said last mentioned elements representative of the carrier frequencies in said antenna during operation of said receiver.

ALEXANDER McLEAN NICOLSON.